(12) United States Patent
Bhogal et al.

(10) Patent No.: US 10,970,330 B1
(45) Date of Patent: Apr. 6, 2021

(54) METHOD OF SEARCHING IMAGES USING ROTATIONAL GESTURE INPUT (71) Applicant: International Business Machines Corporation, Armonk, NY (US)

(72) Inventors: Kulvir Singh Bhogal, Fort Worth, TX (US); Alexandre Polozoff, Indianapolis, IN (US); Sarbajit K. Rakshit, Kolkata (IN); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/689,338

(22) Filed: Nov. 20, 2019

(51) Int. Cl.
| | |
|---|---|
| G06F 3/048 | (2013.01) |
| G06F 16/532 | (2019.01) |
| G06F 3/0484 | (2013.01) |
| G06F 16/535 | (2019.01) |
| G06F 3/0481 | (2013.01) |
| G06F 16/538 | (2019.01) |
| G06F 3/0488 | (2013.01) |

(52) U.S. Cl.
CPC ........ *G06F 16/532* (2019.01); *G06F 3/04815* (2013.01); *G06F 3/04845* (2013.01); *G06F 3/04883* (2013.01); *G06F 16/535* (2019.01); *G06F 16/538* (2019.01)

(58) Field of Classification Search
CPC .... G06F 16/532; G06F 16/538; G06F 16/535; G06F 3/04815; G06F 3/048
See application file for complete search history.

(56) References Cited

U.S. PATENT DOCUMENTS

| | | | |
|---|---|---|---|
| 8,842,135 B2 * | 9/2014 | Jancourtz | G06T 3/4007 345/657 |
| 9,069,403 B2 | 6/2015 | Fujimoto | |
| 10,839,563 B2 * | 11/2020 | Son | G06N 3/08 |
| 2004/0103093 A1 * | 5/2004 | Furuhashi | G06K 9/00208 |
| 2006/0184532 A1 * | 8/2006 | Hamada | G06F 16/50 |
| 2010/0238126 A1 | 9/2010 | Chen et al. | |
| 2013/0006953 A1 | 1/2013 | Epshtein et al. | |

(Continued)

OTHER PUBLICATIONS

Surfly, Co-browsing Solution with Video Chat, printed Jul. 24, 2019, website, © Copyrights 2017, 10 pages. https://www.surfly.com/.

(Continued)

*Primary Examiner* — Rashawn N Tillery
(74) *Attorney, Agent, or Firm* — Jeffrey M. Ingalls (57) ABSTRACT

A method is provided to search for images. The method includes identifying an object in a two-dimensional reference image. The method includes determining a three-dimensional reference orientation axis of the object based on at least one attribute of the object. The method includes receiving an input that requests a change in a three-dimensional perspective of the object. The method further includes determining a new orientation axis based on the input and the reference orientation axis. The method includes executing a search query on a set of two-dimensional images, where the search query is based on the new orientation axis and at least one attribute of the object. The method also includes displaying image search results that are ranked based on correlations with the new orientation axis and the attribute of the object.

20 Claims, 8 Drawing Sheets

(56) References Cited

U.S. PATENT DOCUMENTS

| | | | |
|---|---|---|---|
| 2015/0305703 A1* | 10/2015 | Kim .................. | A61B 6/463 |
| | | | 378/62 |
| 2018/0253819 A1* | 9/2018 | Holzer ................ | G06F 1/1694 |
| 2018/0314405 A1* | 11/2018 | Le Doux ............. | G06F 3/04815 |
| 2018/0335938 A1 | 11/2018 | Zhu et al. | |

OTHER PUBLICATIONS

"From 2-D pictures to 3 dimensions", phys.org, Mar. 3, 2008, © Phys.org 2003-2019 powered by Science X Network, 3 pages. https://phys.org/news/2008-03-d-pictures-dimensions.html.

Lowe, "Three-Dimensional Object Recognition from Single Two-Dimensional Images", This paper has been published in Artificial Intelligence, 31, (Mar. 3, 1987), 39 pages. https://www.cs.ubc.ca/~lowe/papers/aij87.pdf.

Splashtop Collaborative Browser 1.0.0.0 CRX for Chrome, Updated Jun. 25, 2014, Crx4Chrome, 2 pages. https://www.crx4chrome.com/extensions/lffmpcnaljgockopccicgcbddfeohife/.

\* cited by examiner

METHOD OF SEARCHING IMAGES USING ROTATIONAL GESTURE INPUT

BACKGROUND

Display devices can display objects in a two-dimensional ("2D") manner or a three-dimensional ("3D") manner. If an object is displayed in a 2D manner (e.g., as in a flat photograph of a car), the computing system lacks information necessary to change the view of the object to a different angular perspective. However, objects that are displayed in a 3D manner can be viewed on a two-dimensional display device in a variety of different angular orientations or perspectives. For example, computer aided design ("CAD") programs allow the user to rotate a solid (or wire frame) representation of an object to view the object from different angular perspectives. The 3D model of the object includes additional information (e.g., X, Y and Z axis information) that allows the program to regenerate a new image of the object every time the user requests a change in perspective. However, in the case of objects viewed in a 2D manner, a rotational gesture (or other form of user input) will not result in a different viewing angle of the object. Therefore, the user is not able to provide input to change the rotational viewing perspective of the 2D images.

SUMMARY

Embodiments of the present disclosure relate to a method to search for images. The method includes identifying an object in a two-dimensional reference image. The method includes determining a three-dimensional reference orientation axis of the object based on at least one attribute of the object. The method includes receiving an input that requests a change in a three-dimensional perspective of the object. The method further includes determining a new orientation axis based on the input and the reference orientation axis. The method includes executing a search query on a set of two-dimensional images, where the search query is based on the new orientation axis and at least one attribute of the object. The method also includes displaying image search results that are ranked based on correlations with the new orientation axis and the attribute of the object.

Other embodiments of the present disclosure are directed to a computer system and computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

DETAILED DESCRIPTION

Image search engines do not provide 2D image results based on a particular viewing angle of an object in the image, and do not allow user to specify a particular angle for viewing. However, it is desirable to be able to view certain objects from different angles as 2D images, where such objects are not always conducive to being represented by a 3D image model.

The embodiments described herein provide systems, methods and computer program products that enable users to input a desired change in viewpoint of an object in a 2D image, and to receive 2D image search results that are representative of the desired viewpoint. Moreover, the embodiments described herein enable crowdsourcing of new images for missing viewpoints based on user demand for viewing particular objects from particular perspectives.

Figure 1:
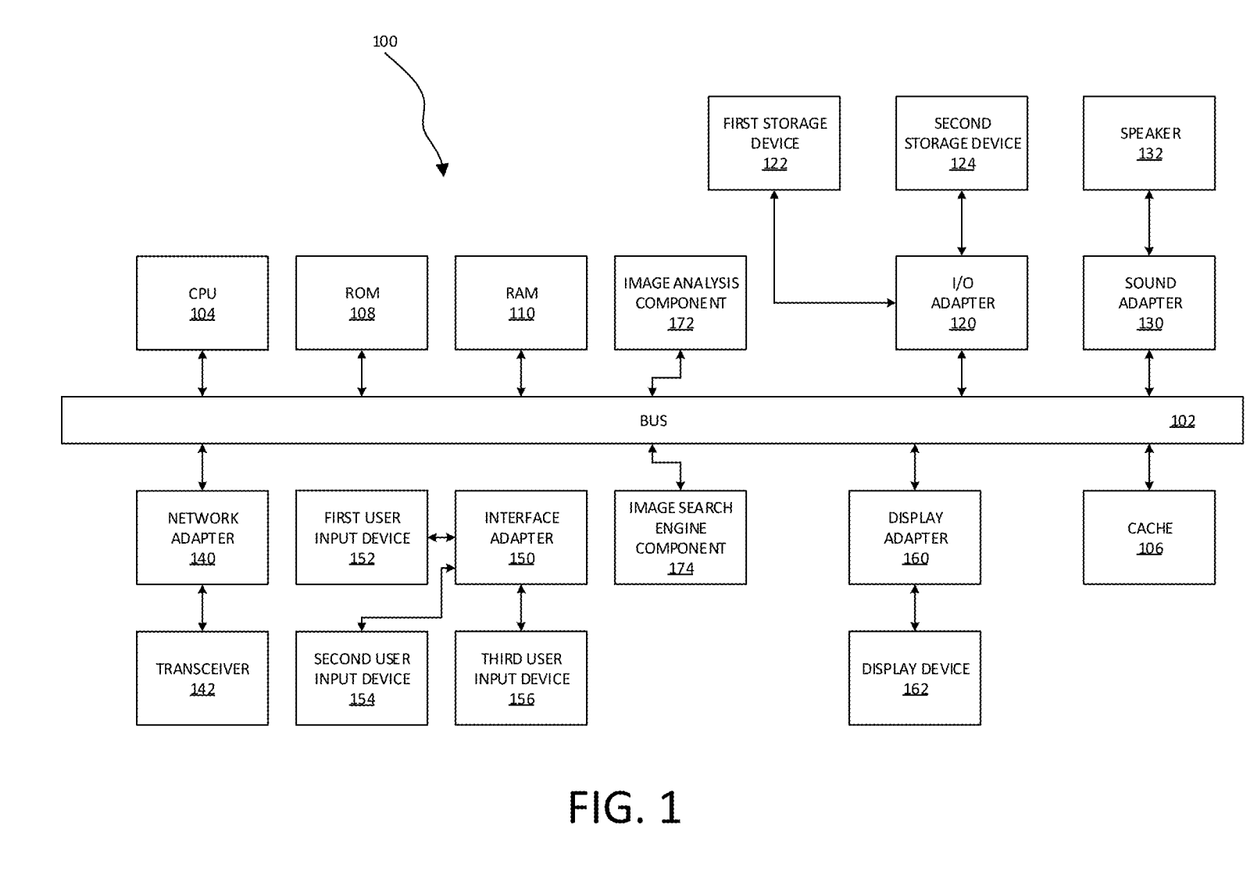
FIG. 1 depicts a block diagram of a processing system, according to embodiments.

Referring now to the drawings in which like numerals represent the same or similar elements and initially to FIG. 1, an exemplary processing system 100 to which the present embodiments may be applied is shown in accordance with one embodiment. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 may be any of a disk storage device (e.g., a magnetic or optical disk storage device), a solid-state magnetic device, and so forth. The storage devices 122 and 124 may be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 may be any of a keyboard, a mouse, a keypad, an image capture device, a motion sensing device, a microphone, a device incorporating the functionality of at least two of the preceding devices, or any other suitable types of input devices. The user input devices 152, 154, and 156 may be the same type of user input device or different types of user input devices. The user input devices 152, 154, and 156 are used to input and output information to and from system 100.

An image analysis component 172 is operatively coupled to the system bus 102. The image analysis component 172 (or engine) identifies objects in an image based on image analysis, image processing, metrology, edge detection, object detection, classifications, etc. performed on the image. The image analysis component 172 is configured to identify a variety of different objects based on many different attributes of the object. The attributes of the object may be identified based on color, model, type of object, shape of object, size of the object, etc. Moreover, using related image classification techniques, the image objects are classified based on the identified attributes.

An image search engine component 174 is operatively coupled to the system bus 102. The image search engine component 174 searches for images based on keywords, a picture, a web link to a picture, image metadata, distribution of colors, shapes, rotational viewpoint, etc.

The processing system 100 may also include other elements (not shown), as readily contemplated by one of skill in the art, as well as omit certain elements. For example, various other input devices and/or output devices may be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present disclosure provided herein.

It is to be understood that although this disclosure includes a detailed description of cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service oriented with a focus on statelessness, low coupling, modularity, and semantic interoperability. At the heart of cloud computing is an infrastructure that includes a network of interconnected nodes.

Figure 2:
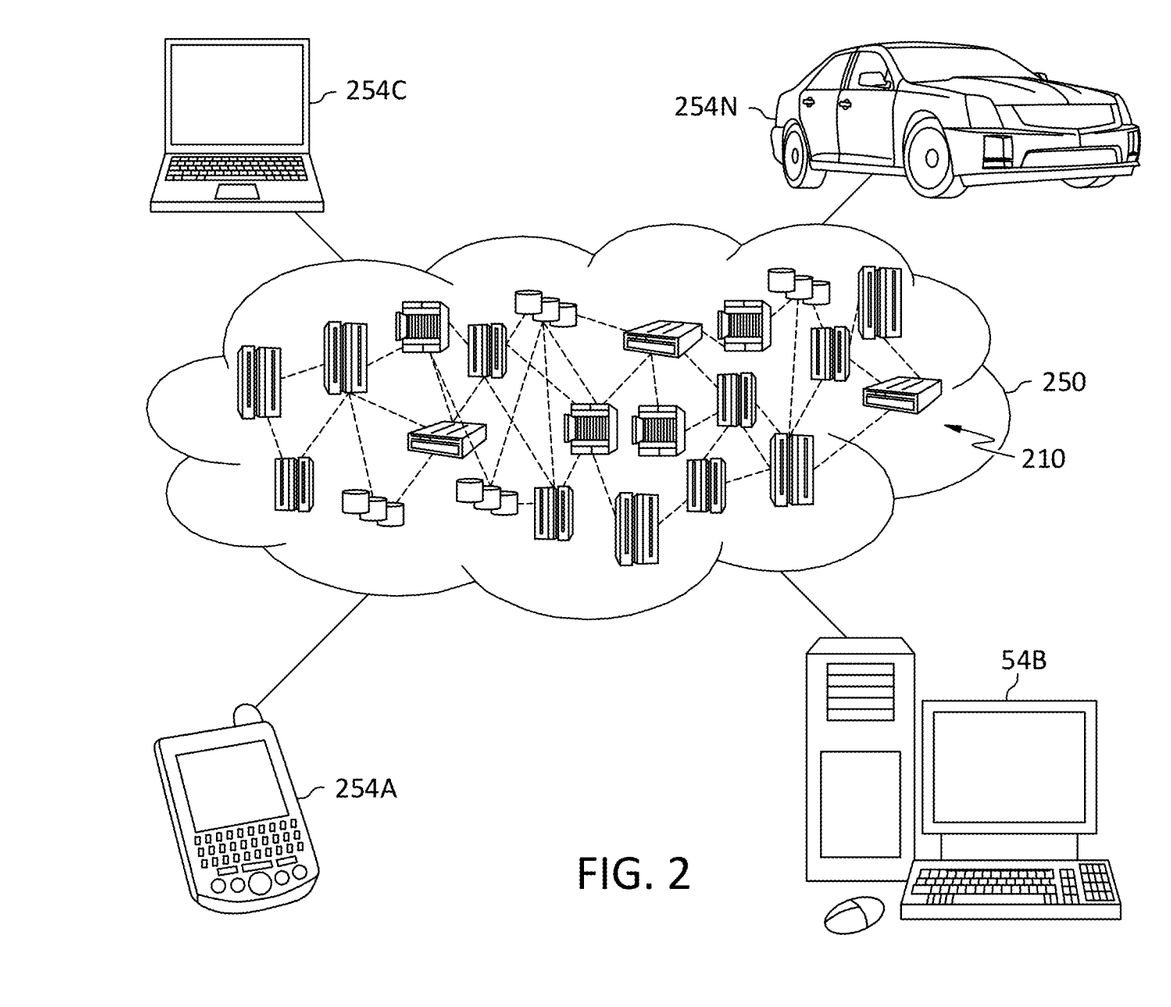
FIG. 2 is a block diagram of an illustrative cloud computing environment having one or more computing nodes with which local computing devices used by cloud customers to communicate, according to embodiments.

Referring now to FIG. 2, illustrative cloud computing environment 250 is depicted. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N may communicate. Nodes 210 may communicate with one another. They may be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
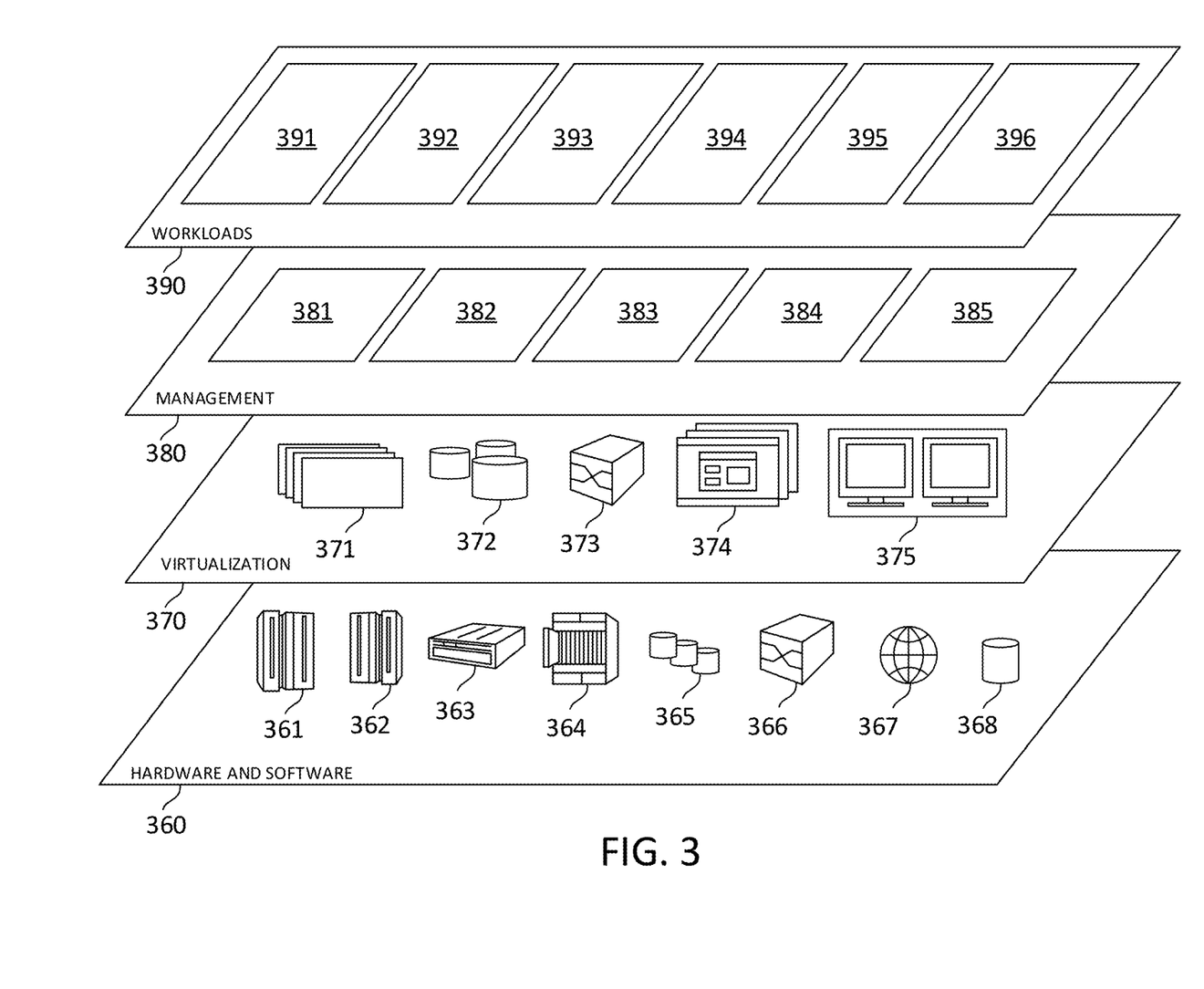
FIG. 3 is a block diagram of a set of functional abstraction layers provided by a cloud computing environment, according to embodiments.

Referring now to FIG. 3, a set of functional abstraction layers provided by cloud computing environment 250 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture-based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and image search engine processing 396.

In certain embodiments, an image search engine receives input from a user regarding a change in angular perspective of a 2D object in an image, and searches for an existing image stored on a storage device that matches this new perspective. Thus, there is a collection of different 2D images of the object that are stored at a plurality of different angular perspectives. This is different from the mechanism of changing angular viewing perspectives for a three-dimensional object (e.g., an object generated in a CAD program), where the system programmatically generates an entirely new image every time there is a change in viewing angle and/or the zoom level.

Figure 4:
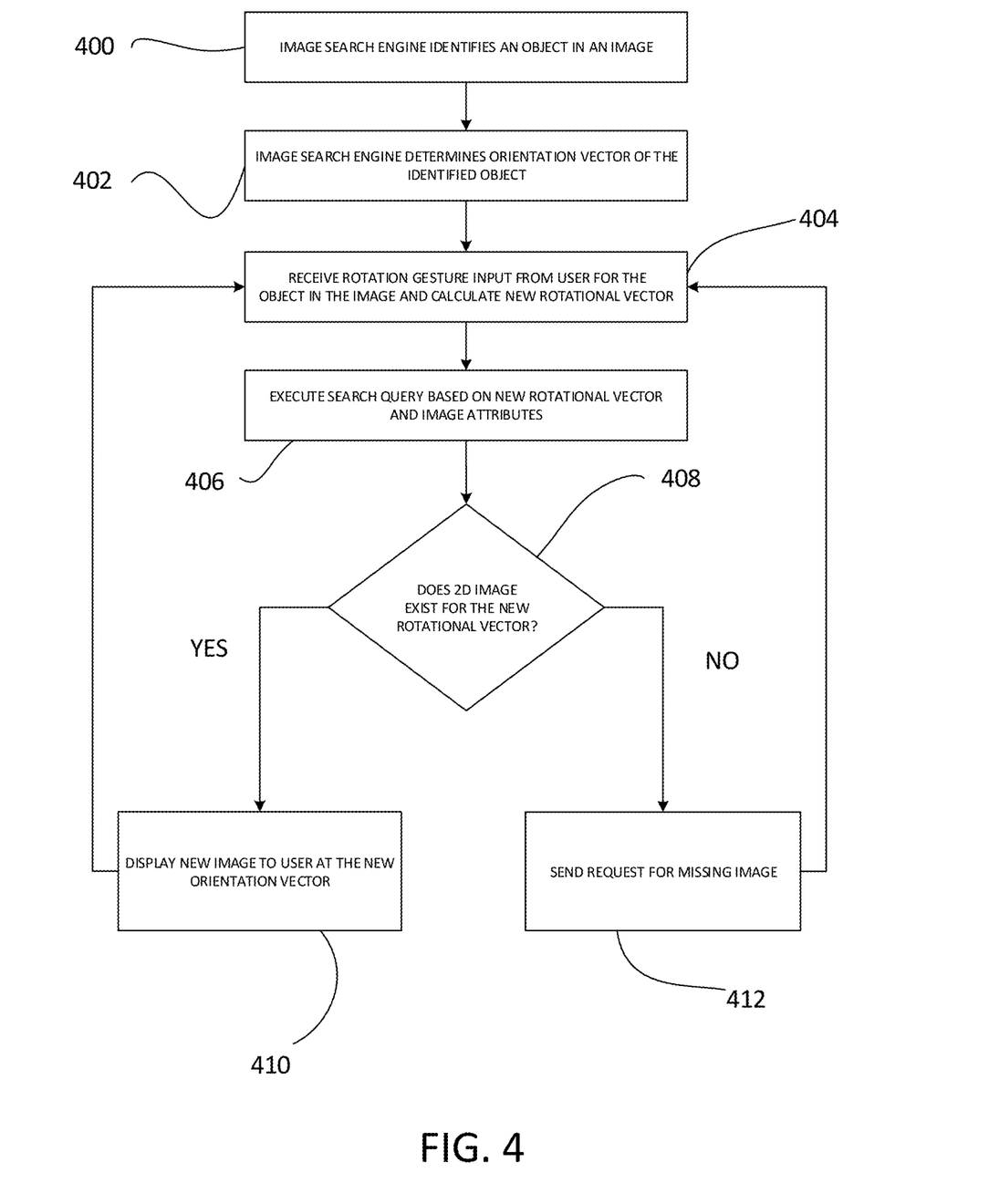
FIG. 4 is a flow chart of an image search method, according to embodiments.

Referring now to FIG. 4, in certain embodiments, in step 400 an image search engine identifies an object in an image. In step 402, the search engine determines an orientation vector of the identified object. In step 404, the search engine receives input from a user for rotation of the object in the image. In one example, as discussed in further detail herein, the input from the user can be a rotational gesture of the user's hand. Based on the input from the user and a magnitude of change of the orientation vector, the image search engine searches a set of images to determine whether other 2D images of the object are available at the new orientation vector. In step 406, the search engine executes a search query based on the new orientation vector, and based on one or more attributes of the image (e.g., the color of the object). In step 408, if the search engine determines that another 2D image is available, this new image is displayed to the user on the display device in step 410. In step 408, if the search engine determines that no 2D images are available for the new orientation vector, there would be no images to display to the user. The search engine recognizes that there is missing information, and in step 412, the search engine makes a request for missing information from one or more sources. As discussed in further detail herein, in certain embodiments, the request for additional information can be a crowdsourcing request. With crowdsourcing, large numbers of people are solicited to contribute images of their own to the image search engine, and these contributed images help complete a set of images so that users can view the object from any 360-degree rotational perspective. After step 410 or step 412 is completed, the system returns to step 404 so that the user may input another rotational gesture. Moreover, in certain embodiments, if the request for a missing image in step 412 is fulfilled by an external source providing such an image, the repository of images may be updated (e.g., automatically, or after approval of the image by a system administrator) with the new image, and future search queries will be executed based on the updated repository of images.

In certain embodiments, the user is presented with a 2D image that contains one or more objects. In step 400, the image search engine analyzes the 2D image to identify the objects present in the image. The identification of the objects is based on image analysis, image processing, metrology, edge detection, object detection, classifications, etc. performed on the image. An image analysis engine can identify a variety of different objects based on many different attributes of the object. The attributes of the object may be identified based on color, model, type of object, shape of object, size of the object, etc. Moreover, using related image classification techniques, the image objects are classified based on the identified attributes.

After identifying the existence of the object, the search engine determines what direction the objects are facing in step 402. In particular, the search engine identifies a baseline direction (or orientation vector) for each of the objects in the image. In an embodiment, the orientation vector is an axis that passes through the calculated center of mass of the object, and this vector extends in a direction from the front of the object to the back of the object. This initial orientation vector of the object is a reference that is used, along with the rotational gesture of the user, to calculate a new orientation vector. In an embodiment, the initial orientation vectors of the objects appearing in the 2D image form part of the metadata of the image and are used by the search engine when searching for new images. It should be appreciated that in certain embodiments the orientation vector does not pass through the center of mass of the object and extend from a front side to a rear side, and it may extend in a different direction relative to the object.

In certain embodiments, there is a library of different orientation directions for different classification types of objects. In these embodiments, data in the library indicates a reference orientation for an animal (e.g., front of the face), or a car (e.g., front side of the car), or a house (e.g., the side of the building having the front door), or any other classification type. In these embodiments, once a reference side of the image object is determined, then an image analysis module assigns the reference orientation axis for the image object. The assigned axis is the reference axis for the recognized object. Once the reference axis of any image object is identified, then other image objects present in the same or different image are compared, and a relative reference orientation or side is calculated. The relative object orientation of different image objects is compared with the reference image object and the orientation axis is calculated based on the difference. In an embodiment, the orientation of different image objects is calculated with respect to the reference image object and is assigned as the current angular orientation of the object. The angular orientation of the object is calculated with respect to a 3D axis, and accordingly the angular orientation of the 3D axis is calculated and is a part of the metadata of the image object.

Figure 5A:
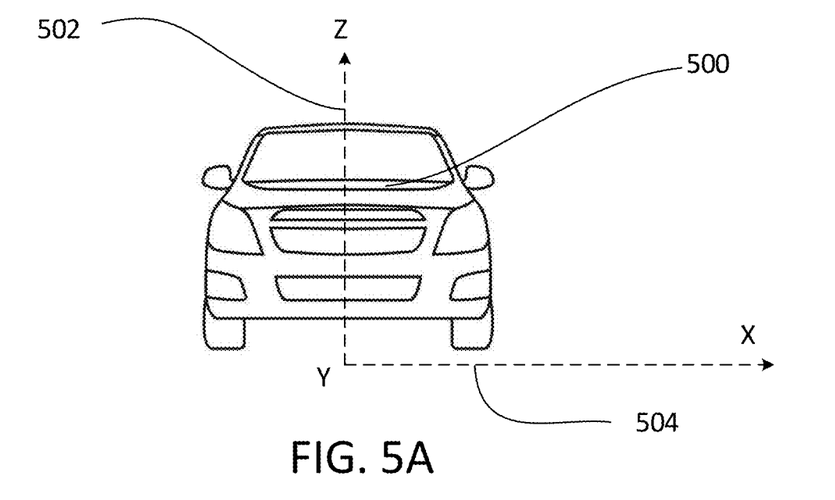
FIGS. 5A and 5B illustrate an example of an object displayed at two different visual orientations, in accordance with an embodiment.
Figure 5B:
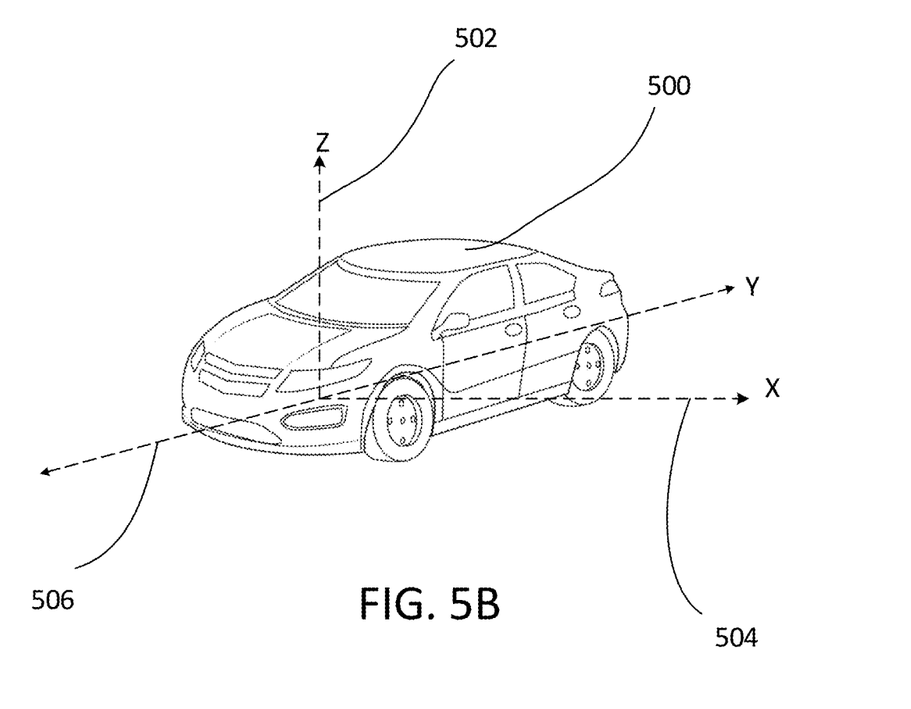

Referring now to FIGS. 5A and 5B, in certain embodiments, a 2D image (e.g., a digital image of a photograph) containing at least one object (e.g., a car) is displayed on a display device. The image is a 2D image, and the object is displayed to the user from an initial three-dimensional angular viewpoint (i.e., perspective). Referring to FIG. 5A, for an object 500, there is a reference image viewpoint. In the example shown in FIG. 5A, the reference image is a front view of the object 500, which can be on the Z and X axes. However, it should be appreciated that any other suitable viewpoint other than a front view could be used for the reference viewpoint. The reference viewpoint also has a corresponding reference orientation vector that perpendicular to the other two axes. Referring to FIG. 5A, an X axis 504 and a Z axis 502 are shown extending in the horizontal and vertical directions, and the reference orientation is along the Y axis 506 direction that is perpendicular to the other axes (see also, the Y axis 506 in FIG. 5B). In an embodiment, the Y axis 506 is the orientation axis (or orientation vector 506) of the object, and the orientation vector 506 runs through a center of mass of the object from a front side of the object to a back side. Referring to FIG. 5B, the object 500 has an orientation vector 506 that is at an angle facing forward, to the left, and slightly downward. The direction of the orientation vector 506 in FIG. 5B has a certain angular offset from the reference orientation vector in FIG. 5A in each of the X axis 504, Y axis 506 and Z axis 502 directions.

Figure 6:
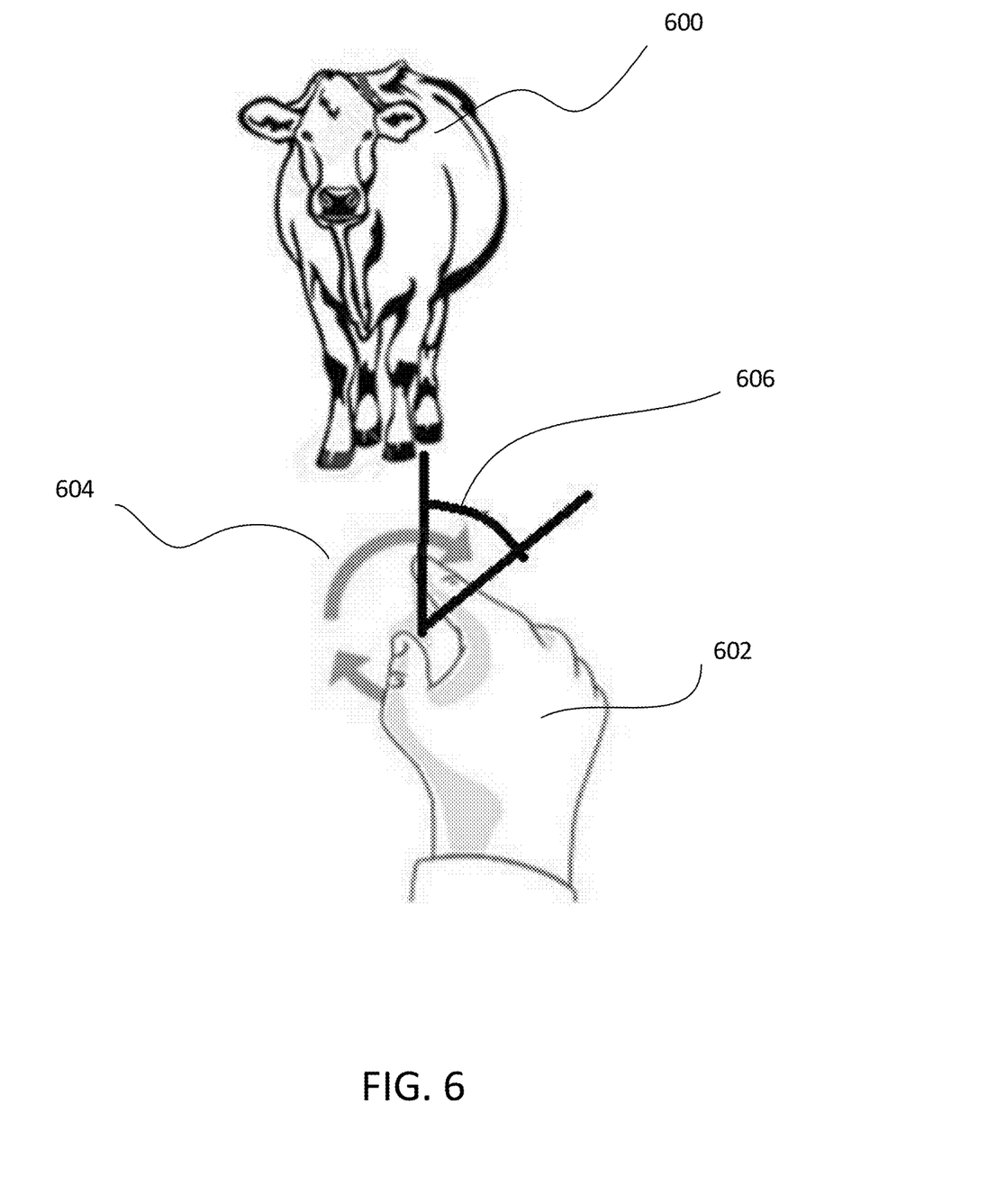
FIG. 6 illustrates an example of an object and a rotational gesture of a user, in accordance with an embodiment.

Referring now to FIG. 6, in an embodiment, if the user desires to see the object 600 from a different orientation or perspective, they can request a different angular viewpoint by providing input to the image search engine. In response to a rotational gesture or other input of the user (e.g., a rotational gesture 604 of a hand 602 of the user), an image search engine determines an amount of desired change in the rotational viewpoint of the object 600 in a 2D image, and searches for a different 2D image that corresponds to the new viewpoint requested by the user. For example, as shown in FIG. 6, the user has performed a rotational gesture 604, and has requested an angular change 606 in the perspective of the object 600. Referring again to FIG. 5B, the object 500 is presented to the user at a different angular perspective relative to the reference viewpoint shown in FIG. 5A or FIG.

6. The user can request changes to the angular viewpoint by providing gesture input any number of times. In certain embodiments, if a different 2D image for the new rotational viewpoint does not exist, the search engine initiates a request to one or more resources to provide the missing image information.

The rotational gesture input that the user provides to the search engine for a change in rotational perspective can be different depending on the type of input device(s) available to the user.

In an embodiment, where the input device is a mouse, the user can perform a click and drag operation on the mouse to request a new perspective of the object. For example, the click and drag operation can specify a distance and an angle relative to an origin point (e.g., the position where the mouse was clicked, or mouse down event). The distance and angle of the final mouse position (e.g., the position where the mouse was released, or mouse up event) from the origin point is a vector that can be used to determine a desired rotation of the object. In another example, the object has a center position, and a distance between this center position, and the positions of the mouse down and mouse up events are all used to determine a desired rotation of the object.

In an embodiment, where the input device is a touch screen enabled display device, the user can perform a touch, drag and rotate operation with one or more fingers to request a change in orientation. With one finger, this rotation request can be performed the same as with the mouse click and drag input discussed above. With more than one finger, the user and pinch or stretch the touch screen to further enable a zoom in or zoom out operation.

In an embodiment, where the input device is an augmented reality (or virtual reality) enabled display device, the user can perform a rotational gesture (e.g., by rotating their hand) to request a change in orientation. In certain of these embodiments, the user can perform a 3D rotation gesture with respect to the 2D object and based on Internet of Things ("IoT") data or other camera feeds, and with this information the system can identify the rotation direction and angular movement of the gesture. For example, cameras can take picture of a person's hand, and through image processing, determine changes in the position, size and orientation of the hand. Based on these changes, the rotational gesture is determined. It should be appreciated that any other suitable type of input may be supplied by the user, provided that the input reflects the desired change in the angular perspective of the object.

In an embodiment, in response to a rotation gesture (or other suitable input) by a user, the search engine uses at least one of: the direction of the rotational gesture; the angular movement of the rotational gesture; the magnitude of the rotational gesture; and the angular orientation (i.e., the orientation vector) of the object currently displayed in the 2D image. Thus, the input designates a change in orientation vector relative to a current orientation vector. Based on this input data, the search engine calculates a new orientation vector of the object, and then the search engine constructs a new search query based on this data. The search engine executes the search query and returns one or more images of the object that have a matching (or at least approximate) orientation vector to the calculated new orientation vector. This new image is displayed to the user on a display device. In this manner, the user can understand how the object looks from a different perspective simply by utilizing a collection of different 2D images, and without having to rely on complex 3D object manipulation programs (e.g., CAD programs). Moreover, the object may not be suitable for viewing as a three-dimensional object in a CAD program (e.g., a mountain range, a tourist landmark, homes, buildings, etc.). This process of selecting new perspectives can be repeated by the user any number of times to view the object in different ways.

In certain embodiments, the search engine uses one or more attributes of the object identified in the 2D image to execute a search query. As indicated above, the search engine executes image analysis on the objects in the 2D image to determine a baseline orientation vector of the object. However, the image analysis can be used to identify one or more additional attributes of the object to aide in the search query. Moreover, metadata of the image file can be used to aide in the search query. Examples of other attributes include the size of the object, the color(s) of the object, the type or category of the object, a geographical location of where the image was captured, a timestamp of when the image was captured, a product part number of the object, other metadata of the image file such as image resolution, graphical features of the object, etc.

In an embodiment, in response to rotational gesture input from the user, the search engine executes a search query to search for a new 2D image of the object that has certain attributes that correlate to the attributes of the original 2D image. For example, if the user is looking at a picture of a red sedan car from a first viewing angle and inputs a rotational gesture to see a new viewpoint, it would be somewhat less effective for the user if search engine presented a new 2D image of a blue pickup truck to the user. Although these are both automobiles, they look quite different. The user may feel a sense of disconnect with the original image, if the new image does not at least substantially visually correspond to the original image. Based on these identified attributes, the search engine attempts to find a new 2D image at the new orientation that has similar (or the same) visual attributes as the original 2D image. Thus, although the viewer is not actually seeing different vantage points of the exact same 3D object, it should feel more natural to the user to see different 2D images having quite similar visual characteristics.

In certain embodiments, the search engine requires that all 2D images are of the exact same object. For instance, if a company has a website with an online product catalogue, the company may want to ensure that the different views of the object are not from slightly different products, to avoid potential customer confusion when purchasing a product. In an example, a product part number (or serial number) is an image metadata attribute of the different 2D images, and this would help to ensure that the image search results do not return a view of a different product.

In certain embodiments, when the search engine displays a 2D image search result, the search engine also displays an indication to the user as to what other viewpoints are available. There may be situations where the search engine has located many stored images of an object from front facing vantage points, but the collection of images of the product from a rear facing view may be few (or completely absent). The system presents a visual indication of the availability of 2D images to the user, so that the user can make informed decisions about which rotational view to select next. For example, if the user knows that there are no rear facing views of the 2D object in the collection, they will not waste time executing a rotational gesture in the rear facing direction.

Figure 7:
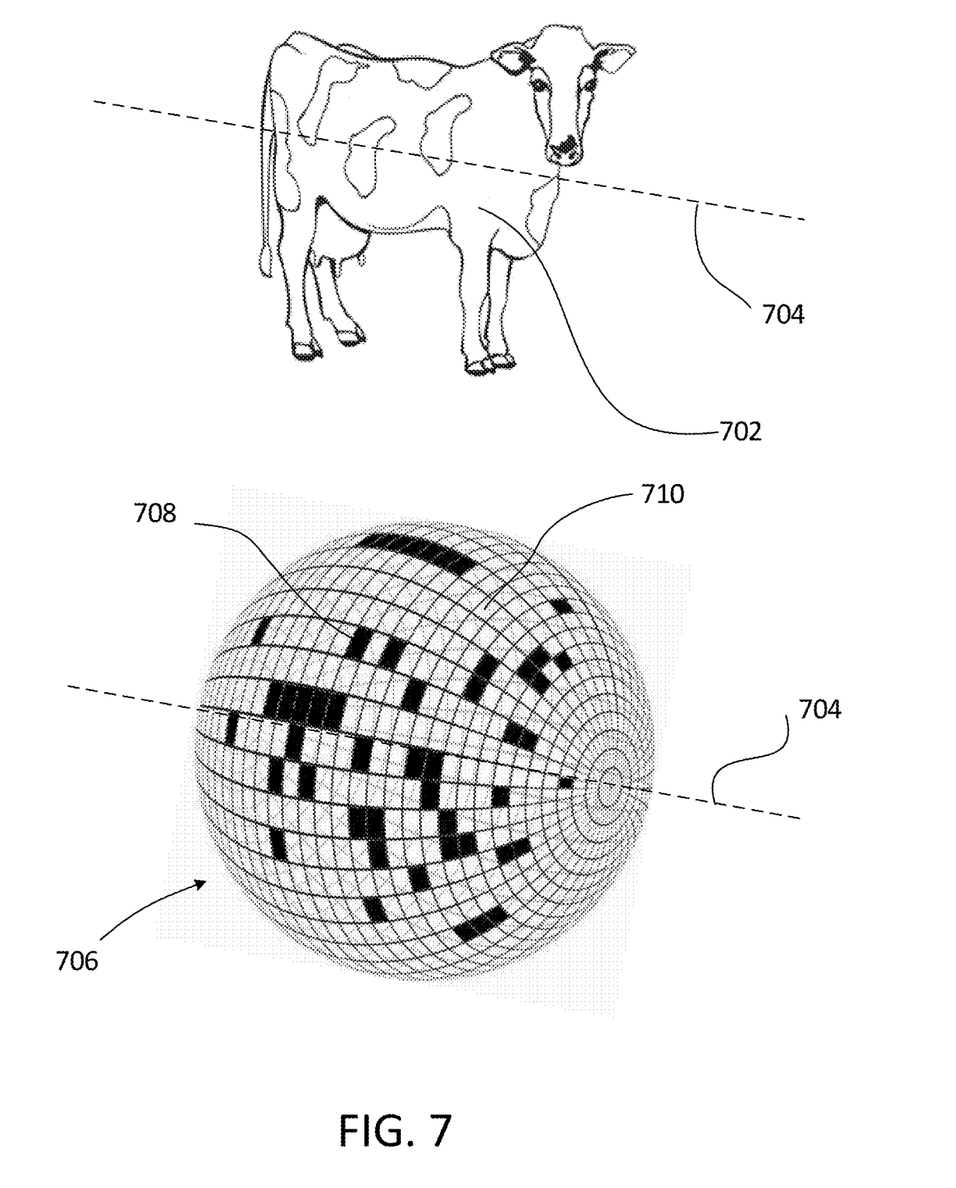
FIG. 7 illustrates an example of an object and a spherical model indicating the available viewpoints in the image search results, in accordance with an embodiment.

Referring now to FIG. 7, in an embodiment, the visual indication to the user of available viewpoints of an object 704 in image search results is shown as a three-dimensional sphere 706. In this example, the sphere 706 has shaded portions indicating the existence of a 2D image of the object 704 at different angular viewpoints. As shown in FIG. 7, the 3D wireframe representation of the sphere 706 has an orientation vector 704. Prior to input of a rotational gesture by the user, a display device displays a current viewpoint of the object 702 having an orientation vector 704 that is the same as the orientation vector 704 of the sphere 706. In certain embodiments, the user may interact with an input device by a rotational gesture, and the image search engine causes a rotation of the sphere 706 on the display device. The new orientation vector 704 of the sphere 706 offers a preview to the user as to what the new viewpoint of the object 702 will be. In certain embodiments, the image search engine does not update the 2D image of the object 702 until after the user completes the rotational gesture. In other embodiments, the image search engine will continually search for and update the images of the object 702 (if they are available) as the user continues to rotate the sphere 706.

In the example shown in FIG. 7, sections of the wireframe sphere 706 are shaded in a binary fashion (e.g., black sections 708 and white sections 710) to indicate whether those angular viewpoints have available 2D images. In this example, if the user were to provide a rotational gesture to the sphere 706, it would rotate to show a new frontmost sectional piece of the sphere. If this frontmost facing spherical section is shaded black, then this would mean that an image search at this angle would produce no results. Therefore, the user would know to continue the rotational gesture to a different angle that would have image results. In an embodiment, if the user rotates the sphere 706 to an angle that has no image results, the search image will find results at a different angular viewpoint that most closely approximates the request by the user. It should be appreciated that it is not necessary that the frontmost section of the sphere be the section of the new viewpoint, and any suitable section could be used. In certain embodiments, the section of the sphere 706 corresponding to the new viewpoint to be selected would be highlighted, colored, or otherwise indicated to the user in some fashion.

In certain embodiments, the sections of the wireframe sphere are not limited to being presented to the user in a binary fashion, and the sections have additional visual indications or indicia that are displayed to the user. For example, if the original 2D image of the object was a blue sedan car, several of the different viewpoints may have different 2D images of a blue sedan car. In this situation, the sections of the wireframe sphere corresponding to these viewpoints may be colored blue. However, for other angular viewpoints, there may only be images of a red sedan car. For these angular viewpoints, the sections of the wireframe sphere corresponding to these viewpoints may be colored red. This would alert the user that for these viewpoints, they will still see a sedan car, but it will not be the same color as the color of the original 2D image of the object. It should be appreciated that the type of indication or indicia on the sphere is not limited to different colors. The type of indicia may be representative of some other visual attribute of the object (e.g., size, type, height, etc.).

Figure 8:
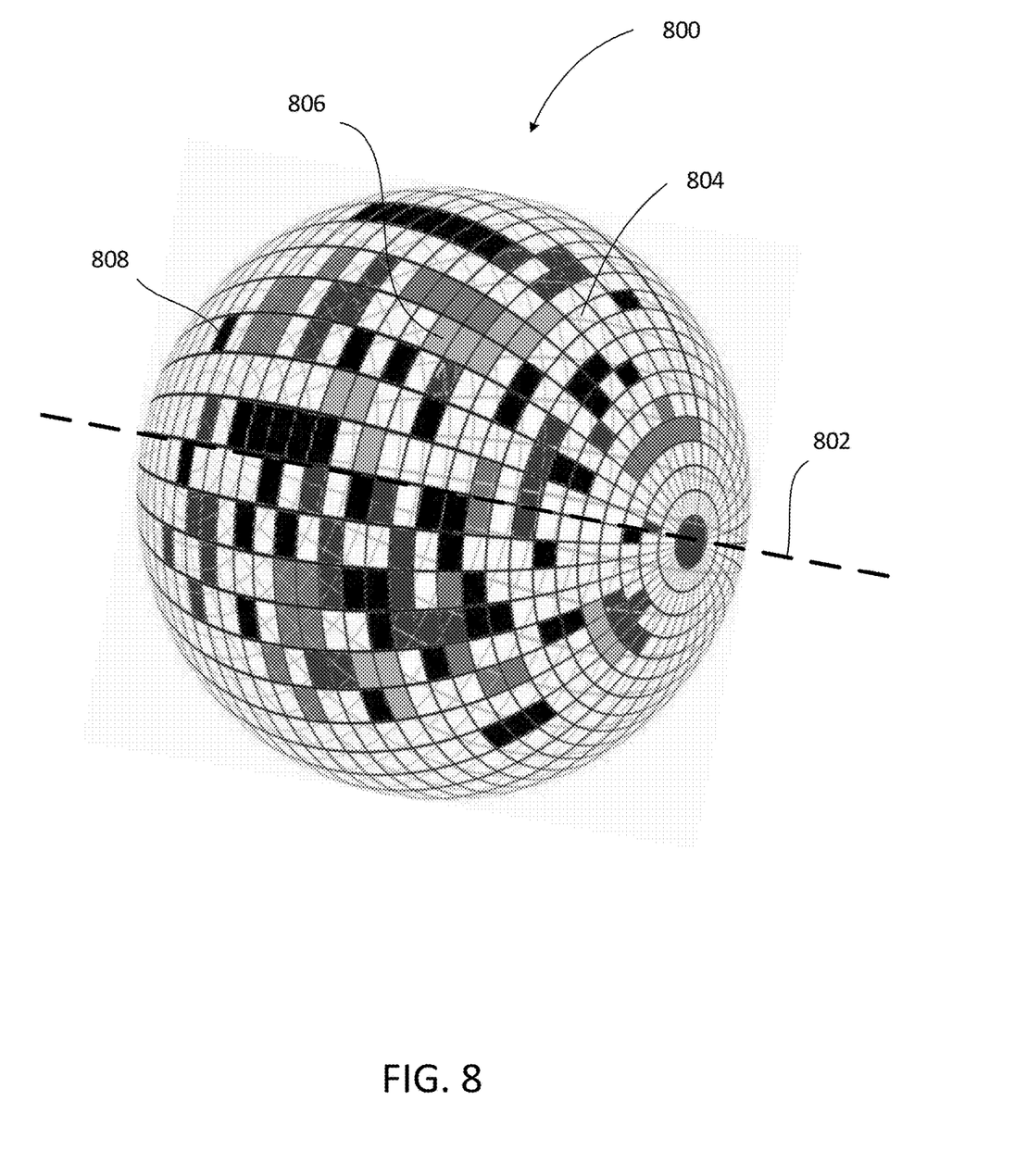
FIG. 8 illustrates an example of a spherical model indicating the available viewpoints in the image search results, and indicating the degree of correlation between the available images and the reference image, in accordance with an embodiment.

Referring to FIG. 8, in certain embodiments, the type of indicia may also be any suitable visual representation of how closely the object in the different views matches the original 2D image of the object. In an embodiment, as shown in FIG. 8, even if all the different three-dimensional viewpoints have an existing 2D image of the object, a heat map of the sphere 800 is presented that represents the degree to which the objects in the different viewpoints match (or differ from) the original image of the object. Referring to FIG. 8, the sphere 800 is shown with the orientation vector 802. In this example, the sphere 800 has a plurality of surface sections. Some of the sections are white sections 804 (or clear), indicating that there is no existing image for that viewing perspective. Other sections are different shades of grey. A light grey section 806 indicates that there is an existing image for that viewing perspective, but that the visual characteristics of the object in that image do not match the original image very closely. The darkness of the shading in a section is indicative of how closely an existing image matches the original image. In this regard, the black sections 808 are much closer matches to the original image than the lighter gray sections (e.g., grey section 806). Thus, this heat map of the sphere 800 provides the user with an easy to comprehend map of where closely matching images exist.

In certain embodiments, angular views that are a very close match to the original image (e.g., the same color and size) can be shown in one color on the 360 degree heat map, while other angular views that are less close of a match (e.g., meeting the criteria of the requested angle but different in color and/or size of the original image) can be shown in a different color on the 360 degree heat map (e.g., shown as red on the heat map versus green). It should be appreciated that the sphere 800 (or other indicator) does not necessarily need to be subdivided into individual surface sections, and any other suitable visual indications can be used to represent a heat map and the degree to which the different existing 2D images match the original image.

In other embodiments, a new angular orientation is determined based on the user's gesture and the angular orientation of the original image object, and the image search results are ranked based on a deviation from new angular orientation. When search results are displayed, the image search engine analyses the image object attributes and identifies the availability of other images from different sources.

It should be appreciated that the viewpoint indicator does not have to be a 3D wireframe sphere. It could be any other suitable object or visual indication that allows the user to select a different three-dimensional viewpoint by a rotational gesture (or other input type). Thus, if the object is a cow, the visual indication could a be 3D wireframe representation of a cow, or any other suitably shaped object. Moreover, the visual indication does not need to be a 3D wireframe model. The visual indication may be any other suitable three-dimensional shape with different surface indicia that indicate an amount of (or absence of) image search results. For example, the visual indicia may be a smooth sphere having a heat map (or color gradient) that indicates the availability of search results at different angles. In other embodiments, the visual indication is a 2D representation rather than a three-dimensional model.

In certain embodiments, the search engine implements methods to identify, request, and supplement missing image information (or request better image information). There may be situations where there is not a complete set of 2D images for every possible angular viewpoint for a given object. In response to a rotation gesture, and an image search query that returns no results, the search engine initiates a request to one or more recipients for additional image data. In an embodiment, the request to one or more recipients includes crowdsourcing image acquisition efforts. In general, crowdsourcing refers to a sourcing model in which individuals or organizations obtain goods and services, including ideas and finances, from a large and dynamic group of contributors (e.g., internet users). Thus, crowdsourcing divides the effort amongst many participants to achieve a cumulative result. In the context of the present embodiments, the goal is to obtain an extremely high number of relevant images for a wide variety of different objects and in a multitude of different orientations for the object. Thus, there may be a very large effort required to create such a large collection of 2D images, and crowdsourcing can be utilized to alleviate or lessen the magnitude of this effort. For example, if the target object is a tourist attraction such as the Eifel Tower, tourists may be willing to submit their vacation photographs of the tower from many different angles. This would help to create a highly relevant set of 2D images of the tower from a variety of perspectives. In certain embodiments, the crowdsourcing contributors are the general public (e.g., all internet users). In other embodiments, the crowdsourcing contributors are a more limited group of users, such as the employees of a company. In an embodiment, the original content provider provides contributors of alternative viewing angles of the parent image with compensation (e.g., monetary compensation, discounts on products/services, etc.) for their image contributions.

In one embodiment, the trigger for creating a crowdsourcing request for images is when a user makes a rotational gesture to see the object from a certain vantage point (with the further requirement that there is no existing image for that vantage point). As discussed above with respect to FIG. 4, if there is a determination in step 406 that no image exists for the new rotational vector, then the image search engine sends a request for missing image information in step 410. In other words, if a user has made a request to see an object from a certain perspective, that indicates that there is an actual demand to the see the object from that angle. However, if there has never been a request to see a product from, for example, the backside, it may not be worth the effort to accumulate photographs of that object from the backside through a crowdsourcing effort. In one example where the object is a car, there may be little or no demand to see the underside of the car. In this example, people are not interested in viewing the object from that angle.

In an embodiment, when contributors respond to the request by offering additional images, the owner of the parent image (i.e., the reference image) has the option to review the image. The owner of the reference image may review the contributed images to determine whether they are of an acceptable quality or match the visual attributes of the parent image to a sufficient degree. If the owner of the parent image decides that the contributed images are acceptable, they can store the image on a storage device and release additional viewing angles of the image for viewing. In another embodiment, there may not be an owner of the parent image, and there is not a person manually reviewing the contributed images. In this embodiment, image processing is performed on the contributed image to determine whether it is a suitable match to the parent image.

In an embodiment, even if the image search query yields some results, the image search engine may still initiate a request for additional image data if the match quality of the image for that rotational viewer is low. For instance, there may be an existing 2D image of an object for a certain angular perspective that has a very low correlation with the object in the original reference image. In one example, the original reference image may be a grey short bed pickup truck, and the saved image for the other perspective is a brown long bed pickup truck with a different make and model than the original. In this example, perhaps the brown long bed pickup truck had some visual attributes that met some threshold to be considered an acceptable match. However, this brown truck is a very poor match for the original image. In this embodiment, in response to a rotation gesture and a determination that a stored image for the new orientation vector has a low correlation with the reference image (i.e., below a certain correlation threshold), the search engine will send a request to one or more recipients to update the image and improve the quality of the match. Upon receiving a new image from a contributor in response to the request, the system compares the newly received image to the previous image. If the new image is determined to be a better match (i.e., to correlate better with the attributes of the original reference image than the current image), then the search image replaces the current image with the new image. In one example, when the received image reference orientation axis and at least one attribute of the received image object correspond to the reference orientation axis and at least one attribute of the reference image to a predetermined degree (e.g., this could be set by the content provider), the system adds the received image to the set of two-dimensional images. In this way, by accepting new images to potentially replace old images, the 360-degree rotational collection of 2D images for a given object can continually improve over time.

In an embodiment, the system utilizes dynamic contextual relational context re-rendering based on object session usage type, task, objective, logical progression of object pertaining to: local user historical machine learning; cloud-based usage for various unique users (sharing context); crowdsourced user machine learning based on the object orientation; and a prediction of user rotation object patters.

In an embodiment, the system utilizes physical location amelioration, by crowdsourcing to geographically pinpoint people that would be most able to help the content provided to complete a model or objective. For example, if there is an area that is in a geofenced boundary, the system selectively looks at each person's current dynamic position and makes a judgement as to whether their unique perspective would be beneficial for that point of view and time (i.e., a temporal decision). This method has an approach of selectively involving only certain people within certain marked locations, and for targeting a temporal event(s) or timeline, thus deriving a unique and more complete model.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of searching for images, the method comprising:
    identifying a reference object in a two-dimensional reference image;
    determining a three-dimensional reference orientation axis of the reference object based on at least one attribute of the reference object;
    receiving an input that requests a change in a three-dimensional perspective of the reference object;
    determining a new orientation axis based on the input and the reference orientation axis;
    executing a search query on a set of two-dimensional images, the search query being based on the new orientation axis and the at least one attribute of the reference object; and
    displaying image search results that are ranked based on correlation with the new orientation axis and the at least one attribute of the reference object.

2. The method of claim 1, wherein the input includes information about a rotational gesture performed by a user.

3. The method of claim 2, wherein the information includes a direction of the rotational gesture and an angular movement of the rotational gesture.

4. The method of claim 1, wherein when the image search result does not produce any results, the method further comprises sending a request to an external image provider resource to supply images that correspond to the new orientation axis and the at least one attribute of the reference object.

5. The method of claim 4, wherein the method further includes:
receiving an image from the external image provider resource;
identifying a received image object in the received image;
determining a received image reference orientation axis of the received image object; and
when the received image reference orientation axis and at least one attribute of the received image object correspond to the reference orientation axis and the at least one attribute of the reference image to a predetermined degree, adding the received image to the set of two-dimensional images.

6. The method of claim 4, wherein the external image provider resource is a crowdsourcing source.

7. The method of claim 1, wherein the reference orientation axis is an axis that passes through a calculated center of mass of the reference object and extends from a front facing side of the reference object to a rear facing side of the reference object.

8. The method of claim 1, wherein the method further includes:
displaying a three-dimensional perspective of a sphere to a user; and
updating a rotational viewing perspective of the sphere to track an input gesture of the user.

9. The method of claim 8, wherein the sphere includes a plurality of surface sections corresponding to a plurality of different viewing angles of the reference object, and the surface sections have visual attributes that indicate if a related image of the reference object exists in the set of two-dimensional images for the corresponding viewing angle.

10. The method of claim 9, wherein the visual attributes of the surface sections further indicate a degree of correspondence between the related images in the set of images and the reference image.

11. A computer system comprising:
a computer readable storage medium with program instructions stored thereon; and
one or more processors configured to execute the program instructions to perform a method comprising:
identifying a reference object in a two-dimensional reference image;
determining a three-dimensional reference orientation axis of the reference object based on at least one attribute of the reference object;
receiving an input that requests a change in a three-dimensional perspective of the reference object;
determining a new orientation axis based on the input and the reference orientation axis;
executing a search query on a set of two-dimensional images, the search query being based on the new orientation axis and the at least one attribute of the reference object; and
displaying image search results that are ranked based on correlations with the new orientation axis and the at least one attribute of the reference object.

12. The computer system of claim 11, wherein the input includes information about a rotational gesture performed by a user.

13. The computer system of claim 12, wherein the information includes a direction of the rotational gesture and an angular movement of the rotational gesture.

14. The computer system of claim 11, wherein when the image search result does not produce any results, the method further comprises sending a request to an external image provider resource to supply images that correspond to the new orientation axis and the at least one attribute of the reference object.

15. The computer system of claim 14, wherein the method further includes:
receiving an image from the external image provider resource;
identifying a received image object in the received image;
determining a received image reference orientation axis of the received image object; and
when the received image reference orientation axis and at least one attribute of the received image object correspond to the reference orientation axis and at least one attribute of the reference image to a predetermined degree, adding the received image to the set of two-dimensional images.

16. A computer program product for implementing a method of searching for images, the computer program product comprising a computer readable storage medium having program instructions embodied therewith, the program instructions executable by at least one computer processor to cause the computer processor to:
identify a reference object in a two-dimensional reference image;
determine a three-dimensional reference orientation axis of the reference object based on at least one attribute of the reference object;
receive an input that requests a change in a three-dimensional perspective of the reference object;
determine a new orientation axis based on the input and the reference orientation axis;
execute a search query on a set of two-dimensional images, the search query being based on the new orientation axis and the at least one attribute of the reference object; and
display image search results that are ranked based on correlations with the new orientation axis and the at least one attribute of the reference object.

17. The computer program product of claim 16, wherein the input includes information about a rotational gesture performed by a user.

18. The computer program product of claim 17, wherein the information includes a direction of the rotational gesture, and an angular movement of the rotational gesture.

19. The computer program product of claim 16, wherein when the image search result does not produce any results, the program instructions further cause the computer processor to send a request to an external image provider resource to supply images that correspond to the new orientation axis and the at least one attribute of the reference object.

20. The computer program product of claim 19, wherein the program instructions further cause the computer processor to:
receive an image from the external image provider resource;

identify a received image object in the received image;
determine a received image reference orientation axis of the received image object; and
when the received image reference orientation axis and at least one attribute of the received image object correspond to the reference orientation axis and the at least one attribute of the reference image to a predetermined degree, add the received image to the set of two-dimensional images.

* * * * *